United States Patent [19]

Aoki

[11] Patent Number: 4,532,449
[45] Date of Patent: Jul. 30, 1985

[54] DC MOTOR
[75] Inventor: Kanemasa Aoki, Yokohama, Japan
[73] Assignee: Canon Kabushiki Kaisha, Tokyo, Japan
[21] Appl. No.: 448,237
[22] Filed: Dec. 9, 1982
[30] Foreign Application Priority Data
Dec. 14, 1981 [JP] Japan .................................. 56-201136
[51] Int. Cl.³ ............................................... H02K 3/00
[52] U.S. Cl. .................................... 310/198; 310/154; 310/234
[58] Field of Search ................... 310/40 MM, 46, 154, 310/234, 89, 198–208, 266, 268, 221, 222, 195, 264; 318/495, 499

[56] References Cited
U.S. PATENT DOCUMENTS

| | | | |
|---|---|---|---|
| 1,693,294 | 11/1928 | Guterres | 310/46 |
| 4,143,288 | 3/1979 | Sato | 310/154 |
| 4,197,475 | 4/1980 | Ban | 310/203 |
| 4,217,508 | 8/1980 | Uzuka | 310/46 |
| 4,243,902 | 1/1981 | Ban | 310/154 |
| 4,315,177 | 2/1982 | Ban | 310/154 |
| 4,315,178 | 2/1982 | Ban et al. | 310/268 |
| 4,404,485 | 9/1983 | Ban et al. | 310/198 |
| 4,459,503 | 7/1984 | Kropp et al. | 310/198 |

Primary Examiner—R. Skudy
Attorney, Agent, or Firm—Fitzpatrick, Cella, Harper & Scinto

[57] ABSTRACT

A DC cored motor in which the rotor core has an odd number of slots to accept a corresponding number of coils which are connected to a commutator with a doubled number of segments, characterized by a combination of $2n+1$ slots with $2n$ magnetic poles in the field magnet, wherein n is an integer equal to or larger than 2.

3 Claims, 13 Drawing Figures

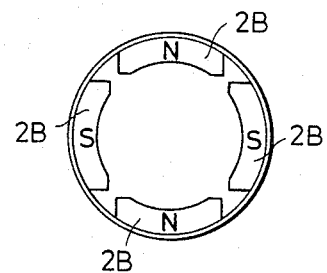
FIG. 7
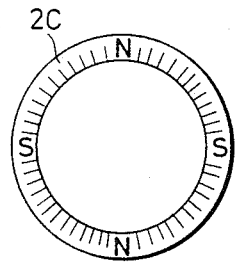
FIG. 8
FIG. 9
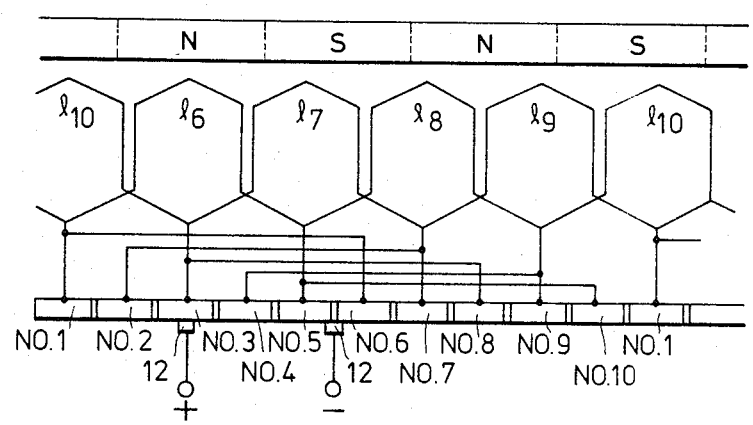
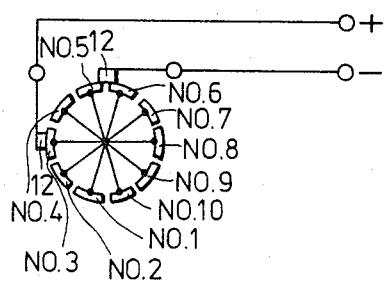
FIG. 10
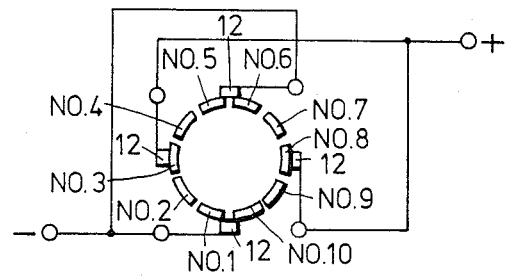
FIG. 11

DC MOTOR

BACKGROUND OF THE INVENTION

1. Field of the Invention

The present invention relates to a DC motor, and more particularly to a cored DC motor with armature coils wound on an iron core provided on the rotary shaft and capable of providing a high torque at a low-speed rotation.

2. Description of the Prior Art

In recent years, DC motors for driving electronic appliances are increasing used in so-called direct driving system in which the motor is directly connected to an object member without intermediate gears or belts. For this reason, there has been required a smaller and lighter motor capable of achieving a high torque and a low-speed rotation with uniform torque and rotation speed.

In order to achieve a lower rotation speed and a higher torque in a motor of a given form and dimension, there is already known the use of an increased number of poles in the field system. More specifically, the revolution N decreases while the torque T increases in accordance with an increase in the number p of poles as represented by following general relations for a motor:

$$N \propto \frac{V - IR}{Z\Phi} \cdot \frac{a}{p}$$

$$T \propto Z\Phi I \cdot \frac{p}{a}$$

wherein:
V: voltage applied
I: current
R: resistance between terminals
Z: total number of effective conductors
$\Phi$: number of effective magnetic fluxes
a: number of parallel circuits
p: number of poles.

The use of multiple poles in small DC motors is common mainly in brushless motors, such as shown in FIG. 1 which corresponds to that disclosed in Japanese Utility Model Application Laid-open No. 52614/1977, but in commutator motors, the use of such multiple poles is limited to the use of four poles in 3-slot motors. In such 3-slot motors the winding density remains same both for 2 poles and for 4 poles as will be explained later, and the use of multiple poles leads to a decrease in the number of effective fluxes $\Phi$ as long as the material of magnets is not changed. For this reason, a significant improvement in the motor performance cannot be expected in such motors.

Although a lower rotation speed and a higher torque are already achieved in brushless motors through the use of multiple poles, the brushless motors themselves are becoming unsuitable for certain appliances such as video tape recorders in consideration of the recent trend toward a smaller and lighter mechanism and toward a lower price.

The motor of the present invention can be manufactured with a cost comparable to that of the conventional cored motors and still is capable of providing a marked improvement in achieving a lower rotating speed, a higher torque and a smaller and lighter structure.

As already known, in order to expand the torque increase rate (m) for a given decrease in the motor revolution, it is necessary to increase a value equal to the square of torque constant divided by the resistance between terminals:

$$m = 1.027 \times (K^2/R) \times 10^{-5}$$

wherein:
K: torque constant (g.cm/A)
R: resistance between terminals ($\Omega$).

Said value m represents the increase in torque per decrease in revolution and is expressed by $m = \Delta T / \Delta N \approx T_s / N_0$
wherein:
$T_s$: starting moment (g.cm)
$N_0$: revolution without load (rpm).

As explained before, said value m is proportional to $K^2$ while $K \propto Z\Phi$, so that there is obtained a relation $m \propto Z^2/R$ since $\Phi$ can be considered approximately constant for a given material of magnet and a given dimension.

As long as a given structure is assumed for the motor, the value of R increases with an increase in Z but the value of m remains substantially constant.

Now let us consider the effect of the number p of poles as a factor influencing on the values of N and T.

For an armature core of a given shape, a coil structure for two poles involves, as shown in FIG. 2, a long coil pitch $L_1$ and mutually overlapping coils $l_1 - l_5$, thus giving rise to long end connections and to a large axial dimension as shown in FIG. 3.

SUMMARY OF THE INVENTION

A prime object of the present invention is to provide a DC cored motor capable of providing a high torque at a relatively low revolution, particularly such DC cored motor allowing flatened construction.

Other objects and advantages of the present invention will become fully apparent from the following description with particular reference to the attached drawings.

BRIEF DESCRIPTION OF THE DRAWINGS

FIG. 7 is a front view of a segmented anisotropic ferrite field system;

FIG. 8 is a front view of an annular magnet with radial anisotropy employed in the present invention;

FIG. 9 is a diagram showing the wiring in the armature of the present invention;

FIG. 10 is a diagram showing the shortcircuiting of commutator segments in the present invention;

FIG. 11 is a diagram showing another embodiment of shortcircuiting of commutator segments;

DESCRIPTION OF THE PREFERRED EMBODIMENTS

Figure 1:
FIG. 1 is a cross-sectional view of a conventional cored motor with 4 magnetic poles, 3 protruding poles (slots) on the core and 3 coils.
Figure 2:
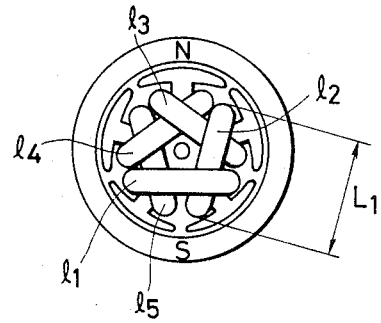
FIG. 2 is a schematic cross-sectional view of a motor with 2 poles, 5 protruding poles on the core and 5 mutually overlapping coils.

The present invention is featured by a DC cored motor provided with an odd number of iron cores for winding armature coils and with a doubled number of segments in the commutator for supplying current to said armature coils, wherein iron cores with $2n+1$ poles are combined with field magnets with $2n$ poles, in which n stands for an integer equal to or larger than 2. Now reference is made to FIG. 4 for explaining the motor structure, wherein shown are a cylindrical motor case 1, and field magnets 2 mounted along the internal periphery of said motor case 1 outside of said armature coils, and with 4 poles mutually separated by 90° as shown in FIG. 5.

A motor shaft 4 is supported by the motor case 1 through a bearing 6. A laminated iron core 8 mounted on an armature 4a on the shaft 4 is provided with 5 protruding poles (i.e., N=2) as shown in FIG. 5 for respectively supporting armature coils $l_6-l_{10}$. A commutator 10 fixed on said shaft 4 is divided into 10 (i.e., $2(2n+1)$) segments for supplying said armature coils with electric power from a line 14 through a commutator brush 12.

Figure 5:
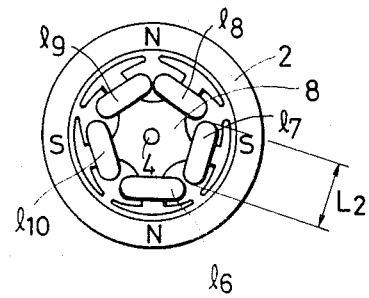
FIG. 5 is a view taken along line A—A of FIG. 4.
Figure 3:
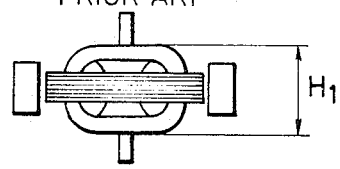
FIG. 3 is a schematic axial cross-sectional view of the motor shown in FIG. 2.
Figure 6:
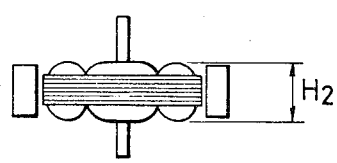
FIG. 6 is a schematic axial cross-section view of the motor of FIG. 4.

The 4-pole structure as shown in FIG. 5 provides an angular distance of 90° between N and S poles thus realizing a short coil pitch L2 with short end connections, and the absence of overlapping coils reduces the axial dimension H2 as shown in FIG. 6, thus allowing to attain a flat motor structure. Also the above-described structure, allowing to incorporate an approximately doubled number of turns within a determined volume, provides an unexpectedly large increase in the value m, in combination with shortened end connections. As a result the number of poles is doubled (from 2 to 4) and the number of conductors is increased by $\sqrt{2}$ times so that the value of m is increased 4 times for a determined material of magnets, even if the shortening of end connections is cancelled by the increase in the number of conductors with respect to the resistance.

A 4-pole DC commutator motor is already realized as a coreless motor not containing a slotted core, but the cylindrical coil in such motor is composed of a dense coil structure and has no space for significantly increasing the number of conductors. For this reason it is not possible to significantly increase the torque though the speed of revolution can be reduced by an increase in the number of poles. Another advantage of such coreless motor lies in a fact that the torque ripple can be reduced by the use of a multi-segment commutator, for example with 5, 7, 9, 11 or 13 segments even in a relatively small commutator since the number of segments is not limited by the number of slots in the iron core.

The present invention allows not only to significantly increase the number of conductors but also to double the number of commutator segments, thereby realizing a motor with an extremely low torque ripple and with an improved efficiency, reaching 80% or even higher, and such motor can be for example used as a direct-drive capstan motor in a video tape recorder instead of the conventional coreless motor.

Also in comparison with the conventional armature with mutually overlapping coils, the armature according to the present invention is lighter for a determined output because of the use of a thinner armature core and of a reduced amount of wire, thereby achieving an improved power rate adequate for use as a servo motor. The improvement in efficiency and the reduced use of wires are also favorable in consideration of energy and material saving.

A 4-times larger value of m signifies that a 4-times larger starting moment can be achieved by a motor with a determined revolution without load, and with magnets of a same material. The above-mentioned effects can be obtained by a combination of $2n$ poles with $2n+1$ slots, wherein n is an integer equal to or larger than 2. On the other hand the use of $2n-1$ slots is not desirable because of a loss in the number of effective conductors and other drawbacks. As an example, a motor with 4 poles and $2n-1=3$ slots (n=2) as shown in FIG. 1 does not provide a perceptible effect since the amount of coils is identical to that in the 2-pole motor. Moreover the use of an armature core same as that in the 2-pole motor may result in a loss in the effective conductor number in relation to the length of arcs in the armature core.

Structures with different values of n, listed in the following table:

|  | poles | Slots | Commutator segments |
|---|---|---|---|
| n = 2 | 4 | 5 | 10 |
| n = 3 | 6 | 7 | 14 |
| n = 4 | 8 | 9 | 18 | provide respective advantages, but a structure with n=2 is particularly preferable since the commutator with 14 or 18 segments is complex in structure and is not so easily adaptable to a small motor.

As is clear from the foregoing table, the number of commutator segments is always twice the number of slots, i.e. $2(2n+1)$.

In the present invention a magnet with optimum distribution of effective magnetic fluxes is required in order to obtain a motor with a low speed of revolution, a high torque and a small torque ripple. An annular magnet composed of isotropic barium ferrite is adequate as a 2-pole field magnet but shows a loss in the number of total fluxes because of an increased leak of flux between the poles when the number of poles is increased. Such loss is contradictory to the aforementioned assumption that the number of effective fluxes $\Phi$ should remain constant for increasing the value of m.

The increase in the magnetic fluxes can be achieved, for a given volume, by an anisotropic ferrite field magnet 2, but in practice such magnet is realized by the use of segment magnets 2B as shown in FIG. 7, since an integral annular magnet may not be manufactured with an acceptable cost by the currently available technology. However, such segment structure not only increases the number of steps in the assembling but also shows a strong magnetic flux at the edges of each magnet segment 2B to an edge effect of each magnet segment 2B, thereby resulting in a strong cogging and giving rise to a motor with uneven torque. In the present invention, however, the abovementioned drawbacks have been resolved by the use of a recently developed annular magnet with radial anisotropy. As shown in FIG. 8, said magnet 2C provides radially oriented uniform magnetic fields, has no edge effect because of annular structure, and can be magnetized with a distribution optimum for obtaining uniform torque. Also said magnet enables to improve the performance by 50% in comparison with the isotropic ferrite magnet, thus providing a high uniform torque.

Now there will be given an explanation on the wirings in the motor. As shown in FIGS. 9 and 10 respectively for the armature and the commutator, there are provided 10 commutator segments for 5 coils, so that it is necessary to shortcircuit the segment risers distanced by 180° or to shortcircuit the brushes distanced by 180° as shown in FIG. 11.

Figure 12:
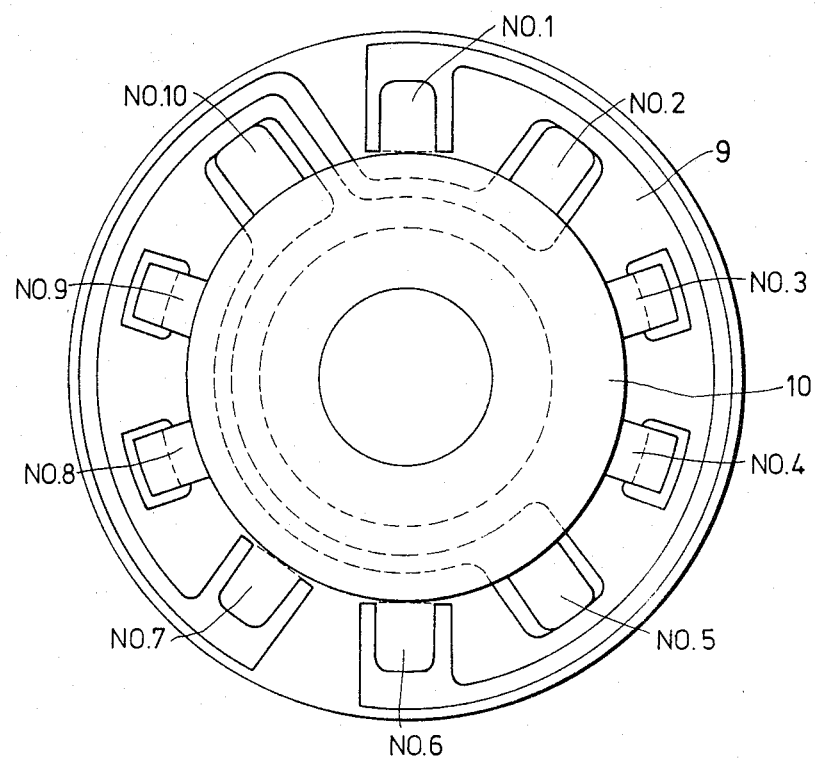
FIG. 12 is a view showing a printed circuit pattern for shortcircuiting commutator risers mutually distanced by 180°.

As is clearly shown in FIG. 9, each alternate commutator segment, i.e. No. 1, No. 3, No. 5, No. 7 and No. 9, is connected to one end of each of two coils which are separated from each other by an intermediate coil. Thus, for example, commutator segment No. 3 is shown to be connected to one end of coils $1_{10}$ and $1_7$, which are separated from each other by intermediate coil $1_6$. As is also clearly shown in FIGS. 9 and 10, each commutator segment is electrically connected, i.e. short circuited, to another segment displaced therefrom by 180° around the commutator Since the use of 4 brushes is rather complex in a small motor, the motor of the present invention adopts the shortcircuiting of risers as shown in FIG. 10, but mere connections with wires are not preferable in consideration of the work efficiency and of the reliability. FIG. 12 shows a printed circuit, on a face of which the risers No. 1 and 6 are connected by a pattern positioned outside the risers, while the risers No. 5 and No. 10 are connected by a pattern positioned inside the risers, and the risers No. 2 and 7 are connected by a pattern positioned inside and outside the risers, and on the other face the risers No. 3-No. 8 and No. 4-No. 9 are mutually connected with patterns similar to those connecting the risers No. 1-No. 6 and No. 2-No. 7. Such printed circuit with above-mentioned patterns enables short-circuiting of risers mutually distanced by 180° among ten risers by simple soldering. The above-described printed circuit has patterns on both faces, but it is naturally possible to form patterns on one face only if the dimension of the circuit board can be selected sufficiently large.

Figure 4:
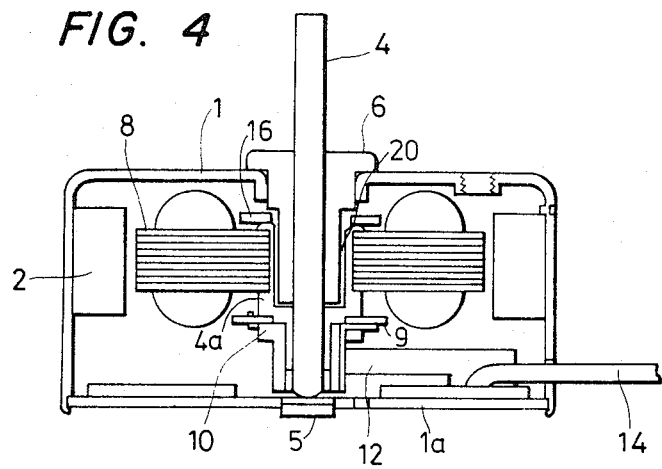
FIG. 4 is an elevational section view of a motor embodying the present invention.

As clearly shown in FIG. 4, the armature coils are located near the periphery of the core 8 and form therewith spaces along the opposite faces of the core. The commutator printed circuit (shown at 9 in FIG. 4) is arranged in the space along one face of the core.

The DC commutator motor of the present invention is characterized by a small size, a light weight and a flat structure, which are derived from the absence of overlapping in the coils at the end connecting zone leading to a significant reduction in the axial dimension of coils for a determined output, and from a fact that the armature 4a is provided at the center with a recess 20 and the armature shaft 4 is supported by an oilless metal element 5 projecting inwardly from the center of the bottom 1a of the motor casing 1 as shown in FIG. 4, thereby dispensing with one of two bearings usually employed in the conventional motors.

In relation to the weight of motor, it will be understood that the field magnetic fluxes pass through the motor casing 1 constituting a magnetic yoke, and that the motor casing can be made thinner with an increase in the number of magnetic poles, since the number of fluxes per pole is reduced. For example when the number of poles is increased from two to four, the thickness of the casing can be reduced to $\frac{1}{2}$. In this manner the present invention is extremely effective for realizing a smaller and lighter motor.

Figure 13:
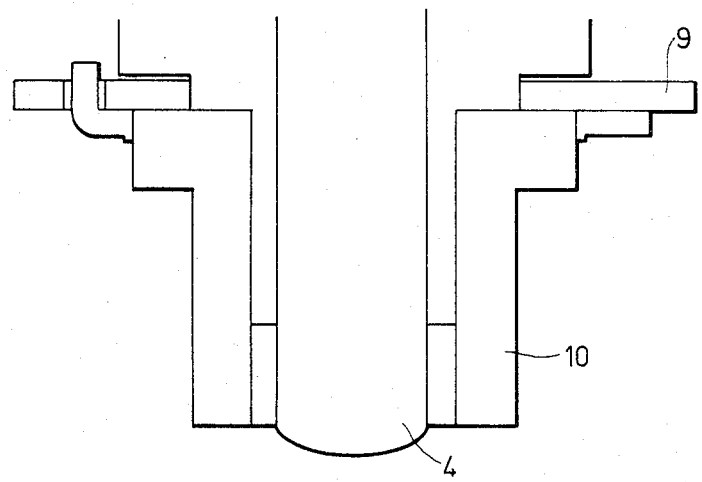
FIG. 13 is a view showing the mounting of the circuit pattern shown in FIG. 12 on the commutator.

In order to avoid sparks, small motors are usually provided with a spark extinguishing element, such as an annular printed resistor or a ring varistor, around the commutator risers. In the motor of the present invention, however, the use of such element is difficult because the printed circuit board 9 shown in FIG. 12 is mounted on the commutator 10 as shown in FIG. 13. In order to avoid such difficulty, a spark extinguishing element 16 is mounted, as shown in FIG. 4, in the space along the core face opposite to the commutator. Such spark extinguishing element 16 does not require a particular wiring but can be simply inserted in the connections between the coil leads and commutator risers.

Further, as shown in FIG. 5, in order to provide a flatter motor, the coils $1_6$-$1_{10}$ are wound around the peripheral edges of the protruding poles of the iron core 8, so as to provide space between the coils and the rotary shaft 4. And, as shown in FIG. 4, the spark extinguishing element 16 and the printed circuit board 9 are arranged in this space. By these arrangements, it is possible to shorten the dimension of the motor in the axial direction and thereby to provide a flatter motor.

What I claim is:

1. A DC cored motor comprising a motor case, a rotary shaft supported by the motor case
    an iron core armature fixed on the rotary shaft and having $2n+1$ equally spaced protruding iron poles, where n is a whole number equal to or greater than 2;
    said protruding iron poles respectively supporting armature coils, each armature coil being wound around a respective protruding pole with no overlapping of said coils;
    a field magnet arranged around the outside of said armature coils and having $2n$ equally spaced poles;
    a commutator mounted on said rotary shaft and divided into $2(2n+1)$ commutator segments for supplying said armature coils with electric power through a commutator brush;
    each alternate commutator segment being connected to one end of each of two coils which are separated from each other by an intermediate coil; and
    each commutator segment being electrically connected to another commutator segment displaced therefrom by 180° around said commutator.

2. A DC cored motor according to claim 1 wherein n is equal to two.

3. A DC cored motor according to claim 1 wherein the armature coils are located near the periphery of the core and form therewith a space between the armature coils and the rotary shaft; and wherein a spark extinguishing element is positioned in said space.

* * * * *

UNITED STATES PATENT AND TRADEMARK OFFICE
CERTIFICATE OF CORRECTION

PATENT NO. : 4,532,449
DATED : July 30, 1985
INVENTOR(S) : Kanemasa Aoki

It is certified that error appears in the above-identified patent and that said Letters Patent is hereby corrected as shown below:

Column 4, line 58, after "2B" insert the word
-- due --.

Signed and Sealed this

Seventeenth Day of December 1985

[SEAL]

Attest:

DONALD J. QUIGG

*Attesting Officer*  Commissioner of Patents and Trademarks